2,765,338

NEW ALIPHATIC ACID AMIDE DERIVATIVES AND PROCESSES FOR THE PRODUCTION THEREOF

Hans Suter, Dorflingen, and Hans Zutter and Hans Widler, Schaffhausen, Switzerland, assignors to Cilag Limited, Schaffhausen, Switzerland, a Swiss company No Drawing. Application June 3, 1953,
Serial No. 359,441

Claims priority, application Switzerland June 8, 1952

7 Claims. (Cl. 260—562)

The invention provides a series of new amides of basic ethers of the general formula

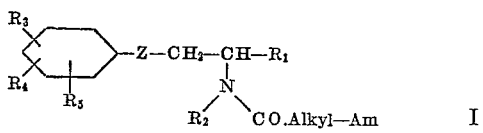

in which $R_1$ and $R_2$ each represent a hydrogen atom, alkyl, or aralkyl radical, $R_3$, $R_4$ and $R_5$ each represent a hydrogen atom, halogen atom, alkoxy, hydroxy or alkyl group, amine or acylamino group, Am represents an amino, alkylamino, dialkylamino or cycloalkylenamino group, which latter apart from the nitrogen atom may also contain other hetero atoms, for example a sulphur or an oxygen atom, and Z represents an oxygen or a sulphur atom. Compounds of the above-mentioned formula produce a surprisingly strong local anesthesia.

The invention also provides two processes for the production of the new aliphatic acid amide derivatives.

According to the first of these processes the new compounds are produced in the following way:

A phenoxyaminoalkane of the formula

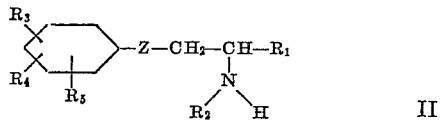

in which $R_1$, $R_2$, $R_3$, $R_4$, $R_5$ and Z have the meaning already defined is reacted with a reactive functional derivative of an $\alpha$-, $\beta$- or $\gamma$-halogeno substituted aliphatic carboxylic acid, e. g. a halide, an anhydride or an ester. The condensation product obtained of the formula:

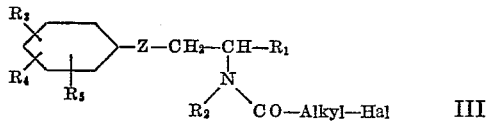

is subsequently reacted with a primary or secondary amine of the formula:

$$Am\ H \qquad\qquad IV$$

to give a good yield of the new aliphatic acid amides of Formula I above. The reaction with the amine is preferably carried out by heating and with the aid of a basic condensing agent or with an excess of the amine employed in the reaction. It is advantageous to work in a solvent, e. g. in methanol, ethanol, benzene or toluene. If the base of the Formula IV has a low boiling point the reaction is effected in a closed vessel.

The second process for the production of the new amides, especially the propionic or higher fatty acid amides, consists in treating a compound of the formula

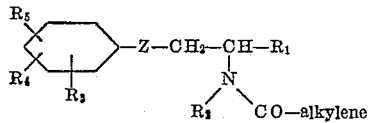

in which $R_1$, $R_2$, $R_3$, $R_4$, $R_5$ and Z have the meaning already defined, with an amine of the formula:

$$H.Am \qquad\qquad IV$$

where "Am" has the meaning already defined so that addition of the amine IV to the double bond of the alkylene group of the compound V takes place.

It is preferable to work in the presence of catalysts, e. g. quaternary bases such as tetramethyl ammonium hydroxide.

All the amides obtained as described above may also be isolated in the form of their salts with non-toxic organic or inorganic acids.

Example 1

$\alpha$-Pipecoline is added drop by drop to 27.1 gms. of 1-(p-chlorophenoxy)-2-(N-methyl-N-chloroacetyl)-aminopropane. Afterwards it is treated with 100 ccs. of absolute benzene and boiled for four hours under reflux. After cooling, the precipitated $\alpha$-pipecoline hydrochloride is extracted with water. The benzene solution is then extracted with 2 N hydrochloric acid and the aqueous acid extract is extracted with ether. Afterwards the basic amide formed is liberated with sodium hydroxide solution and taken up in ether. After drying over potash and evaporation of the ether, the residue is distilled twice in high vacuum to give 1-(p-chlorophenoxy)-2-[N-methyl - N - (2' - methyl - piperidino - acetyl)] - amino propane as a yellowish oil, boiling under 0.01 mm. at 170–173° C., in 55% yield.

Example 2

16 gms. of $\alpha$-pipecoline are added drop by drop to 18.4 gms. of 1-phenoxy-2-[N-chloroacetyl-amino]-propane. Afterwards 200 ccs. of absolute benzene are added and the reaction is boiled on the water bath for five hours. The precipitated $\alpha$-pipecoline hydrochloride is extracted with water; then the benzene solution is shaken with ether. Afterwards the aqueous layer is treated with concentrated sodium hydroxide solution and the base set free is taken up in ether. After drying over potash and evaporation of the ether the residue is twice distilled in high vacuum. Hereby 13 gms. of 1-phenoxy-2-[N-(2'-methyl-piperidino-acetyl)]-aminopropane, boiling under 0.02 mm. at 146–147° C., are obtained.

*Analysis.*—Calc. C, 70.31%; H, 9.02%; N, 9.65%. Found C, 70.53%; H, 9.38%; N, 9.78%.

Example 3

To 16.4 gms. of 1-(2'.4'.6'-trimethyl-phenoxy)-2-(N-methyl-N-chloro-acetyl)-amino ethane, 10.6 gms. of morpholine are added drop by drop. After the weak reaction has decreased, 50 ccs. of absolute benzene are added and the reaction mixture is boiled on the steam bath for two hours. The precipitated morpholine hydrochloride is extracted in water; afterwards the benzene solution is extracted with 2 N hydrochloric acid. The aqueous layer is shaken with ether, then reacted with concentrated sodium hydroxide solution and the base set free is taken up in ether.

After drying over potash and evaporation of the ether the residue is distilled twice in high vacuum. In this way 1 - (2'.4'.6' - trimethyl - phenoxy) - 2 - (N - methyl - N-morpholino-acetyl)-amino ethane, boiling under 0.02 mm. at 168–169° C., is obtained in a yield of 81%.

The substance forms crystals which, recrystallised from petroleum ether, melt at 78–80° C.

*Analysis.*—Calc. C, 67.47%; H, 8.81%; N, 8.74%. Found C, 67.25%; H, 9.00%; N, 8.51%.

Example 4

14.5 gms. of 1 - (2'.4' - dimethyl - phenoxy) - 2 - N-ethyl aminopropane and 7.1 gms. of triethylamine are together dissolved in 100 ccs. of absolute benzene. To this solution 8 gms. of chloro-acetyl chloride in 20 ccs. of absolute benzene are added drop by drop with cooling and stirring. The reaction mixture is stirred at room temperature for one hour, the precipitated triethylamino hydrochloride is filtered off with suction and thoroughly washed with benzene.

The filtrate is concentrated to about 100 ccs. and then 10 gms. of pyrrolidine are dropped in and the whole is boiled on the water bath for three hours. After cooling, the reaction mixture is shaken with water and afterwards with 2 N hydrochloric acid. The aqueous acid layer is extracted with ether, then treated with concentrated sodium hydroxide. The base set free is taken up in ether, dried over potash and the ether is evaporated. The residue is twice distilled in high vacuum, and in this way 1 - (2'.4' - dimethyl - phenoxy) - 2 - (N - ethyl - N-pyrrolidino-acetyl)-amino-propane, boiling under 0.01 mm. at 155–156° C., is obtained in a yield of 72%.

*Analysis.*—Calc. C, 71.66%; H, 9.50%; N, 8.80%. Found C, 71.50%; H, 9.50%; N, 9.04%. The compound is readily soluble in organic solvents and in 2 N HCl, less soluble in water.

Example 5

23 gms. of 1-phenoxy-2-methyl aminopropane and 15.1 gms. of triethylamine in 150 ccs. of ether are reacted drop by drop with stirring and cooling with 17 gms. of chloro-acetyl chloride in 30 ccs. of ether. Triethylamine hydrochloride precipitates and after two hours is separated by shaking with water. The ethereal solution is dried and evaporated, and the residue is distilled in high vacuum. In this way 26.4 gms. of 1-phenoxy-2-(N-methyl-N-chloro-acetyl)-aminopropane, boiling under 0.05 mm. at 146–147° C. are obtained. It is a colourless oil, readily soluble in ethanol, methanol, acetone and ether, but sparingly soluble in water and petroleum ether. 24 gms. of this new chloro-acetyl amide are heated for twenty-two hours on the water bath with 22 gms. of diethylamine in 100 ccs. of benzene. After cooling, the mixture is shaken with water, the benzene solution is dried and evaporated. The residue distils under 0.06 mm. at 142–143° C. 23.4 gms., i. e. 84% of the theoretical quantity, of 1 - phenoxy - 2 - (N - methyl - N - diethylamino - acetyl) - aminopropane are obtained. This is a colourless oil, hardly soluble in water, but soluble in organic solvents and mineral acids.

Example 6

50 gms. of 1 - phenoxy - 2 - methylaminopropane and 32 gms. of triethylamine in 600 ccs. of absolute ether with 51 gms. of β-bromopropionic acid chloride are added drop by drop with stirring and cooling, to 150 ccs. of ether. Triethylamine hydrochloride precipitates immediately. The reaction mixture is stirred at 20° C. for two hours, then shaken with water and with aqueous sodium carbonate solution. After drying of the ethereal solution and evaporation the β-bromopropionyl compound is further reacted as described under (*a*) or (*b*) below.

(*a*) 38 gms. of the β-bromopropionyl product obtained as above are dissolved in 100 ccs. of ethanol and reacted with stirring with a solution of 25 gms. of dimethylamine in 120 ccs. of ethanol. The mixture is stirred for two hours with ice cooling and for fifteen hours at 20° C. and then evaporated on the water bath; the viscous residue is shaken with ether and 5 N sodium hydroxide solution. The ethereal solution is treated with 2 N hydrochloric acid, the aqueous acid solution is made strongly alkaline and the separated oil is taken up in ether. After drying with potash the ether is evaporated and the residue is distilled in high vacuum. In this way 23 gms. of 1 - phenoxy - 2 - (N - methyl - N - β - dimethylamino-propionyl) - aminopropane are obtained, boiling under 0.05 mm. at 148–149° C. This is a slightly yellowish oil, readily soluble in water and organic solvents. The hydrochloride of the compound is readily soluble in water and gives a neutral reaction.

(*b*) 38 gms. of the β-bromopropionyl compound are reacted with 28 gms. of diethylamine as described under (*a*). In this way 21 gms. (56.5% of the theoretical quantity of 1 - phenoxy - 2 - (N - methyl - N - β - diethyl - aminopropionyl) - aminopropane) are obtained. Boiling point: 0.03 mm., 159–160° C. Yellowish oil, hardly soluble in water, readily soluble in organic solvents and dilute mineral acids.

Example 7

22 gms. of 1 - (2' - acetaminophenoxy) - 2 - N - methylamino - propane and 25 gms. of triethylamine are dissolved in 100 ccs. of benzene and carefully reacted with ice cooling with a solution of 17.2 gms. of β-bromopropionyl chloride in 30 ccs. of benzene. The mixture is stirred at room temperature for another hour and afterwards for 2½ hours on the steam bath. The precipitated triethyl ammonium chloride and bromide are separated by shaking with water, the benzene solution is dried and evaporated in vacuum. The remaining brown oil cannot be caused to crystallise. It is dissolved in benzene and several times shaken with 2 N hydrochloric acid. The benzene solution is then dried and evaporated in vacuo. On grinding the residue with ether crystals are formed, which melt at 78–86° C. By recrystallisation from petroleum ether/benzene 3:1 these crude crystals can be purified. They they melt at 96–97° C. Yield: Crude 11.5 gms., purified 5.2 gms., i. e. 18.8% of the theoretical, of 1 - (2' - acetaminophenoxy) - 2 - (N-methyl-N-acroyl)-aminopropane.

Example 8

5.5 gms. of the amide obtained according to Example 7 together with 7.3 gms. of diethylamine and with the addition of 2 drops of tritone B (benzyltrimethyl ammonium hydroxide) are boiled on the water bath. Solution occurs, and after boiling for six hours the excess diethylamine is distilled off. The remaining brown oil (7 gms.) is shaken with 50 ccs. of 2 N hydrochloric acid and the same amount of ether. The acid aqueous solution is washed with ether and afterwards made alkaline with concentrated sodium hydroxide solution. A yellowish oil separates and is taken up in ether. The ethereal solution is dried and after evaporation leaves 5.2 gms. of a yellowish, viscous mass.

This mass is purified by re-dissolving in pure ether and dried at 50° C. in high vacuum. In this way 4.2 gms., i. e. 60% of the theoretical, of a pure compound of the constitution

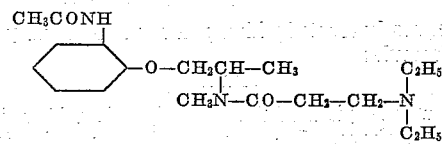

are obtained. The compound is hardly soluble in petroleum ether, but readily soluble in water, ethanol, acetone, ether, benzene and chloroform. Its picrate melts at 125–126° C.

More compounds of the general formula

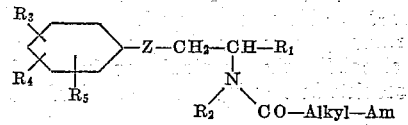

which have been prepared are set out in the table below; these compounds may usefully be obtained according to one of the hereinbefore-described processes (Z=oxygen)

| R₃ | R₄ | R₅ | R₁ | R₂ | Alkyl | Am | B. P., mm.° |
|---|---|---|---|---|---|---|---|
| —H | —H | —H | —H | —C₂H₅ | —CH₂ | —N(C₂H₅)₂ | 0.03¹³⁸⁻¹³⁹° |
| 2-CH₃ | 4-CH₃ | 6-CH₃ | —H | —CH₃ | —CH₂ | —N(C₂H₅)₂ | 0.02¹⁵⁵⁻¹⁵⁶° |
| —H | —H | —H | —CH₃ | —H | —CH₂ | —N(C₂H₅)₂ | 0.02¹²⁷⁻¹²⁹° |
| —H | —H | —H | —CH₃ | —H | —CH₂ |  | 0.02¹⁴⁶⁻¹⁴⁷° |
| —H | —H | —H | —CH₃ | —CH₃ | —CH₂ | —N(C₂H₅)₂ | 0.06¹⁴²⁻¹⁴³° |
| —H | —H | —H | —CH₃ | —C₂H₅ | —CH₂ | —N(C₂H₅)₂ | 0.01¹³⁵⁻¹³⁶° |
| —H | —H | —H | —CH₃ | —C₂H₅ | —C₂H₄ | —N(C₂H₅)₂ | 0.01¹⁵⁰⁻¹⁵¹° |
| —H | —H | —H | —CH₃ | —C₂H₅ | —CH₂ | 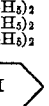 | 0.01¹⁵⁴⁻¹⁵⁵° |
| 2-CH₃ | —H | —H | —CH₃ | —CH₃ | —CH₂ | —N(C₂H₅)₂ | 0.02¹⁴²⁻¹⁴³° |
| 2-CH₃ | —H | —H | —CH₃ | —C₂H₅ | —CH₂ | —N(C₂H₅)₂ | 0.02¹⁵²⁻¹⁵³° |
| 2-CH₃ | —H | —H | —CH₃ | —C₂H₅ | —CH₂ | 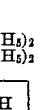 | 0.02¹⁵⁵⁻¹⁵⁶° |
| 3-CH₃ | 5-CH₃ | —H | —CH₃ | —CH₃ | —CH₂ | —N(C₂H₅)₂ | 0.02¹⁵⁵⁻¹⁵⁶° |
| 3-CH₃ | 5-CH₃ | —H | —CH₃ | —C₂H₅ | —CH₂ | —N(C₂H₅)₂ | 0.02¹⁵⁵⁻¹⁵⁶° |
| 2-CH₃ | 4-CH₃ | —H | —CH₃ | —CH₃ | —CH₂ | —N(C₂H₅)₂ | 0.02¹⁴⁴⁻¹⁴⁷° |
| 2-CH₃ | 4-CH₃ | —H | —CH₃ | —C₂H₅ | —CH₃ | —N(C₂H₅)₂ | 0.02¹⁵¹° |
| 2-CH₃ | 4-CH₃ | —H | —CH₃ | —C₃H₅ | —CH₃ | 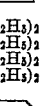 | 0.02¹⁶⁵⁻¹⁶⁶° |
| 2-CH₃ | 4-CH₃ | —H | —CH₃ | —C₂H₅ | —CH₃ |  | 0.01¹⁶⁶° |
| 2-CH₃ | 4-CH₃ | —H | —CH₃ | —C₃H₅ | —CH₃ | 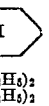 | 0.01¹⁵⁵° |
| 2-CH₃ | 4-CH₃ | 6-CH₃ | —CH₃ | —CH₃ | —CH₃ | —N(C₂H₅)₂ | 0.01¹⁶⁰⁻¹⁶¹° |
| 2-CH₃ | 4-CH₃ | 6-CH₃ | —CH₃ | —CH₃ | —C₂H₄ | —N(C₂H₅)₂ | 0.03¹⁵⁸⁻¹⁵⁹° |
| 2-CH₃ | 4-CH₃ | 6-CH₃ | —CH₃ | —CH₃ | —CH₂ | 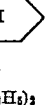 | 0.01¹⁷⁹⁻¹⁸⁰° |
| 2-CH₃ | 4-CH₃ | 6-CH₃ | —CH₃ | —C₂H₅ | —CH₂ | —N(C₂H₅)₂ | 0.03¹⁵⁵⁻¹⁵⁷° |
| 2-CH₃O | —H | —H | —CH₃ | i-C₃H₇ | —CH₂ | —N(C₂H₅)₂ | 0.02¹⁴⁷⁻¹⁵⁸° |
| 2-CH₃O | —H | —H | —CH₃ | —CH₃ | —CH₂ | —N(C₂H₅)₂ | 0.015¹⁵⁸⁻¹⁵⁹° |
| 4-Cl | —H | —H | —CH₃ | —CH₃ | —CH₂ | —N(C₂H₅)₂ | 0.01¹⁶⁶⁻¹⁶⁸° |

What we claim is:

1. New aliphatic acid amide derivative selected from the group consisting of compounds of the formula

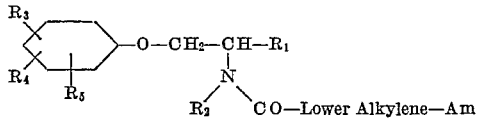

in which R₁ and R₂ are substituents selected from the group consisting of hydrogen atoms and lower alkyl radicals, R₃ is a substituent selected from the group consisting of a hydrogen atom, a chlorine atom, a lower alkyl radical, and a lower alkoxy radical, R₄ and R₅ are substituents selected from the group consisting of hydrogen atoms and lower alkyl radicals, and Am is a radical selected from the group consisting of a di-lower alkylamino radical, a pyrrolidino radical, a piperidino radical, an α-methyl piperidino radical, and a morpholino radical, and salts of said aliphatic acid amide derivatives with nontoxic organic and inorganic acids.

2. Process for the production of a new aliphatic acid amide derivative of the formula

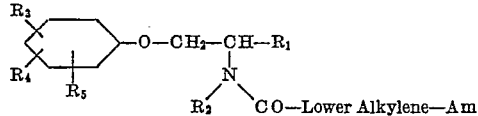

in which R₁ and R₂ are substituents selected from the group consisting of hydrogen atoms and lower alkyl radicals, R₃ is a substituent selected from the group consisting of a hydrogen atom, a chlorine atom, a lower alkyl radical, and a lower alkoxy radical, R₄ and R₅ are substituents selected from the group consisting of hydrogen atoms and lower alkyl radicals, and Am is a radical selected from the group consisting of a di-lower alkylamino radical, a pyrrolidino radical, a piperidino radical, an α-methyl piperidino radical, and a morpholino radical, comprising heating a phenoxyaminoalkane of the formula

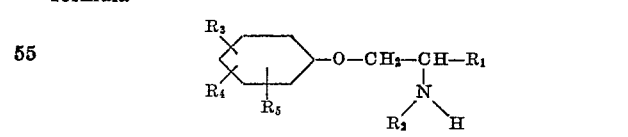

wherein R₁, R₂, R₃, R₄ and R₅ have the aforesaid meaning, with a halogeno-substituted lower aliphatic carboxylic acid halide of the formula

Hal—Lower Alkylene CO—Hal and further heating the obtained condensation product of the formula

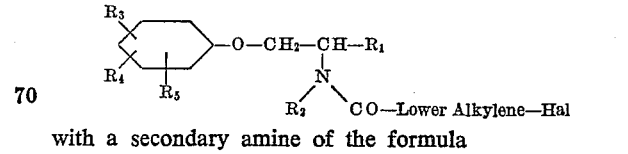

with a secondary amine of the formula

AmH in which said Am has the said meaning.

3. The new chemical compound of the formula

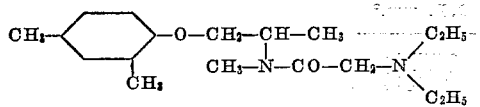

boiling at 144–147° C./0.02 mm.

4. The new chemical compound of the formula

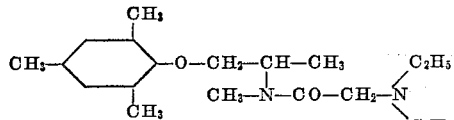

boiling point 160–161° C./0.01 mm.

5. The new chemical compound of the formula

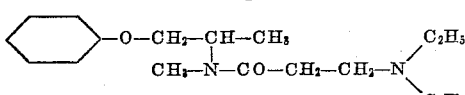

boiling point 159–160° C./0.03 mm.

6. The new chemical compound of the formula

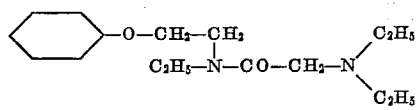

boiling at 138–139° C./0.03 mm.

7. The new chemical compound of the formula

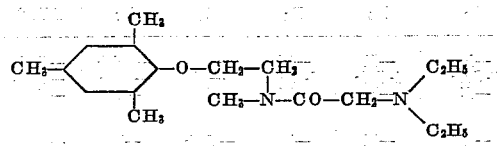

boiling at 155–156° C./0.02 mm.

References Cited in the file of this patent

UNITED STATES PATENTS

| 2,654,758 | Papa et al. | Oct. 6, 1953 |
| 2,657,210 | Clinton | Oct. 27, 1953 |

OTHER REFERENCES

Simons, Ind. and Eng. Chem., vol. 39, p. 238 (1947).
Suter et al.: Liebig's Annalen, vol. 576, pp. 223–231, Apr. 9, 1952.